(12) United States Patent
Kartik

(10) Patent No.: US 7,800,863 B1
(45) Date of Patent: Sep. 21, 2010

(54) GUIDE FOR DIRECTING TAPE MEDIA ALONG TAPE PATH WHILE APPLYING BALANCED LATERAL FORCES TO MINIMIZE CONTACT BETWEEN GUIDE AND TAPE

(75) Inventor: Venkataraman Kartik, Pittsburgh, PA (US)

(73) Assignee: Oracle America, Inc., Redwood Shores, CA (US)

( * ) Notice: Subject to any disclaimer, the term of this patent is extended or adjusted under 35 U.S.C. 154(b) by 886 days.

(21) Appl. No.: 11/097,413

(22) Filed: Apr. 1, 2005

(51) Int. Cl.
*G11B 15/60* (2006.01)

(52) U.S. Cl. ............ 360/130.21; 226/190; 242/346; 242/615

(58) Field of Classification Search ............ 360/130.21; 226/190, 193, 196.1; 242/346, 346.2, 615, 242/615.2, 615.3, 615.4
See application file for complete search history.

(56) References Cited

U.S. PATENT DOCUMENTS

| | | | |
|---|---|---|---|
| 3,827,617 A * | 8/1974 | Anderson | 226/196.1 |
| 3,867,021 A * | 2/1975 | Mueller et al. | 352/72 |
| 4,310,863 A * | 1/1982 | Lelandais | 360/130.21 |
| 4,324,372 A * | 4/1982 | Majicek et al. | 242/346.2 |
| 4,335,857 A * | 6/1982 | Pfost et al. | 242/346.2 |
| 4,440,359 A * | 4/1984 | Nelson | 242/346.2 |
| 5,409,174 A * | 4/1995 | Doninelli | 226/196.1 |
| 6,267,325 B1 * | 7/2001 | Rathweg | 242/615.2 |
| 6,969,021 B1 * | 11/2005 | Nibarger | 242/346.2 |
| 2005/0094308 A1 * | 5/2005 | Mahnad et al. | 360/77.12 |
| 2005/0098767 A1 * | 5/2005 | Ryals et al. | 254/134.3 FT |
| 2005/0270687 A1 * | 12/2005 | Zweighaft | 360/77.12 |

* cited by examiner

*Primary Examiner*—Craig A. Renner
(74) *Attorney, Agent, or Firm*—Brooks Kushman P.C.

(57) ABSTRACT

A tape guide is provided for use in routing a tape media, used in a computer or other application, along a pre-specified path of travel. The tape guide is oriented along a vertical axis and comprises three sections or components joined together to form an integral guide structure. Upper and lower sections both comprise frustoconical sections, the respective dimensions of the two frustoconical sections being equal to one another in a useful embodiment. A tape is wrapped around the guide, whereby the tape is directed along its path of travel. As the tape moves, the upper and lower sections apply downwardly and upwardly directed biasing forces, respectively, to maintain the moving tape in an equilibrium position in order to avoid contact between the edges of the tape and any guide structure.

14 Claims, 3 Drawing Sheets

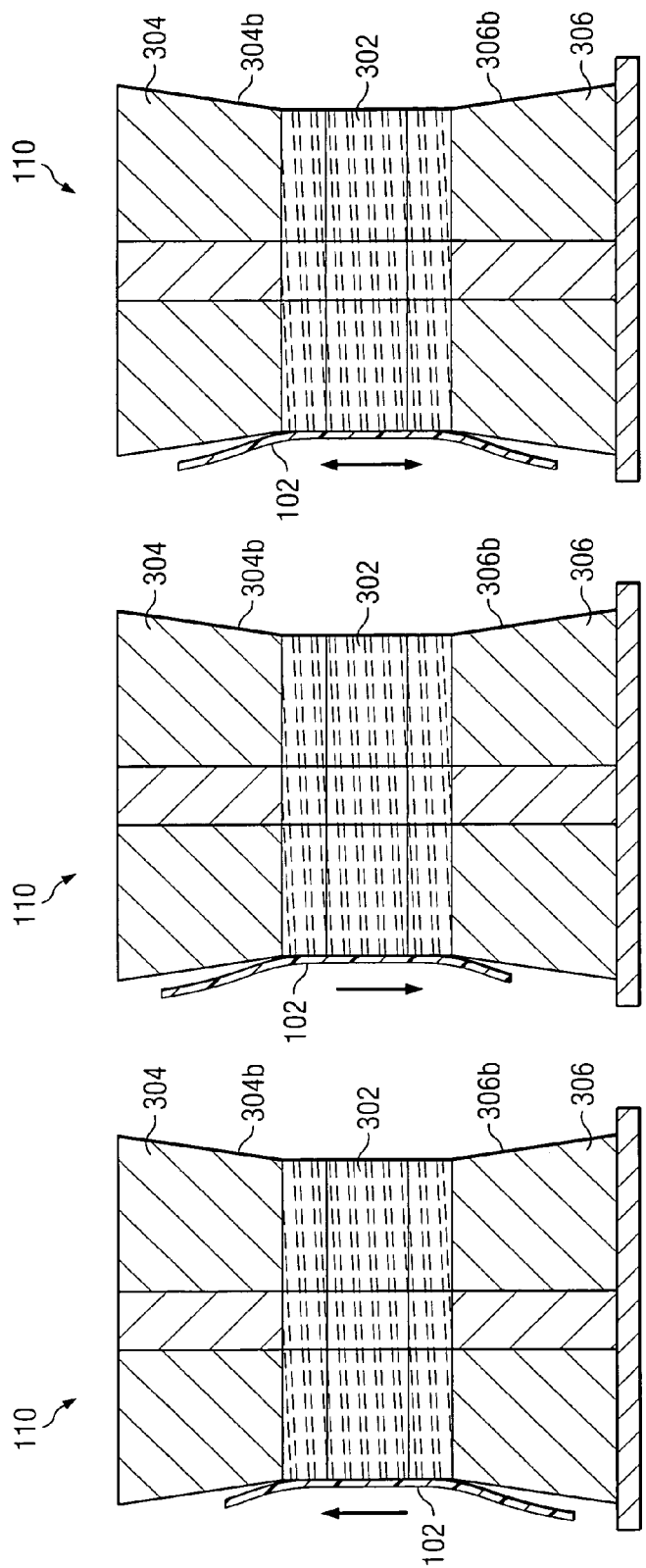

GUIDE FOR DIRECTING TAPE MEDIA ALONG TAPE PATH WHILE APPLYING BALANCED LATERAL FORCES TO MINIMIZE CONTACT BETWEEN GUIDE AND TAPE

BACKGROUND OF THE INVENTION

1. Field of the Invention

The invention disclosed herein generally relates to a guide for use in directing or routing tape media, of a type used in data storage applications, as it moves along a designated path of travel. More particularly, the invention pertains to a tape guide of the above type that significantly reduces contact between the guide and the edge or edges of the tape. Even more particularly, the invention pertains to a tape guide of the above type wherein upper and lower guide components respectively apply opposing lateral forces to the moving tape media, to urge the tape to a preselected equilibrium position between the two ends of the tape guide.

2. Description of Related Art

There is a continuing need to achieve higher data storage density and data transfer rates on magnetic tape media, such as tape media that is used for computer data storage and other applications. It is anticipated that this need will result in a migration toward thinner tape as well as an increase in tape transport speed. Current guiding technologies typically use grooved or smooth rollers and stationary guides or posts to guide the tape, wherein the rollers or posts are provided with flanges. The flanges physically contact the edge or edges of the tape, in order to constrain and direct its motion. Such contact between the tape edges and the flanges of the guide is generally undesirable, as it causes tape edge wear that tends to significantly reduce tape life. This problem is likely to be aggravated as tape media thicknesses are reduced in the future. Moreover, impacts between the tape edge and the flanges can cause tape motion that is difficult for the head servo to follow at high tape transport speeds, thereby leading to read/write errors. More particularly, narrower data tracks and higher tape speeds tend to increase track mis-registration, due to inadequate servo bandwidth.

For the above reasons, conventional guiding techniques may prove to be inadequate in future applications of tape storage. Thus, new tape guiding solutions are required that reduce or eliminate contact between the tape edges and the guide flanges, while minimizing any increase in cost, size or complexity of the tape drive. Unfortunately, a number of newer guiding technologies, such as active guiding or pressurized air bearings, have been found to have one or more of these disadvantages. Moreover, it would be desirable to provide a tape guide wherein the tape media was not biased against any one surface of the guide.

SUMMARY OF THE INVENTION

The invention generally seeks to reduce or eliminate contact between the edges of tape media and the flanges or other structure of the tape guide, while still effectively guiding the tape media along its intended path of movement. In one useful embodiment, a novel guide surface geometry is used to position the tape, so that the tape is substantially equidistant from the flanges or the edges at both ends of the guide. In the invention, a tape guide for use in routing a tape media along a prespecified path of travel comprises a central component, and first and second end components. The central component comprises a cylindrical section having an axis. The first and second end components are joined to first and second ends, respectively, of the central component to collectively form an integral structure, the three components being aligned in coaxial relationship with one another. The integral structure is disposed to engage a side of the tape, as it moves along its path of travel. The first end component is configured to apply a first force to the tape, to urge the tape laterally along the axis toward the second end component and away from a first edge member of the first component, wherein the first force increases as a linear function of the position of the tape along the axis. The second end component is configured to apply a second force to the tape that is directed in opposition to the first force, to urge the tape away from a second edge member of the second component. The second force likewise increases as a linear function of the position of the tape along the axis. The collective effect of the first and second forces is to apply a balanced lateral force, tending to urge the tape to a preselected position somewhere between the first and second edge members, as the tape moves along the path of travel. As used herein, the term "edge member" refers to a flange at the end of a tape guide, and also to other structure at the end of the guide, that could bear against the edge of the tape if the tape was allowed into contact therewith.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6-8 are sectional views, respectively similar to the sectional view of FIG. 3, that are provided to depict different positions of the tape in response to the biasing forces applied thereto.

DETAILED DESCRIPTION OF THE PREFERRED EMBODIMENT

Figure 1:
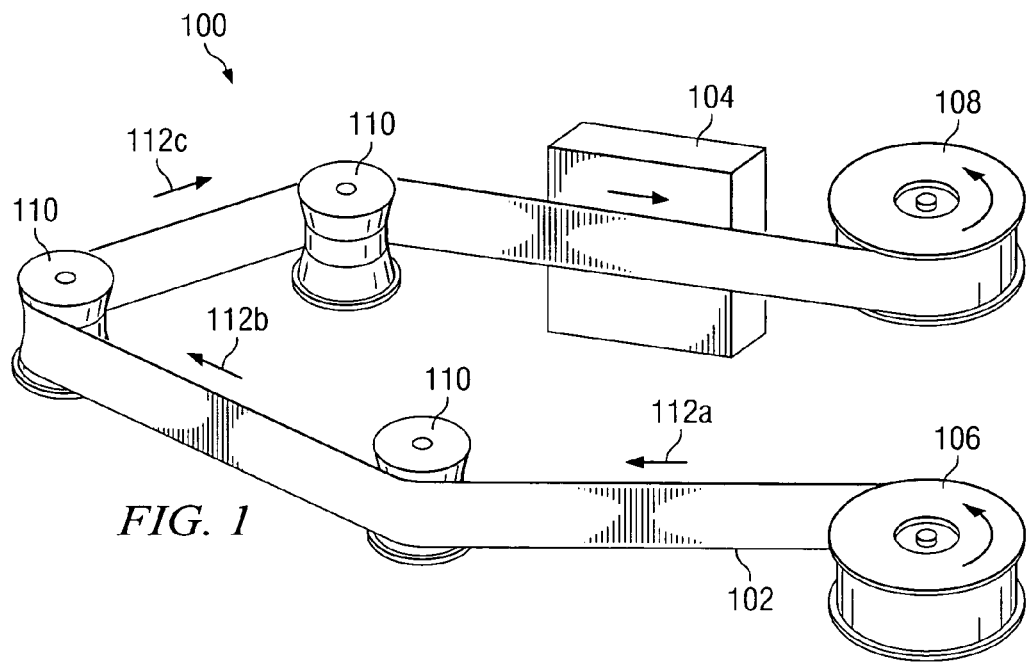
FIG. 1 is a perspective view showing a tape-drive system using a tape guide comprising an embodiment of the invention.

Referring to FIG. 1, there is shown a tape drive system 100 disposed to move a magnetic tape or tape media 102 with respect to a tape read/write head 104. Tape media 102 is thereby enabled to provide data to or receive data from tape head 104. While tape drive system 100 could be used for data storage and retrieval in a computer system, the present invention is not limited thereto. For example, tape drive system 100 could be used in connection with storage or retrieval of video data or the like.

FIG. 1 shows system 100 having tape reels 106 and 108, driven by a motor or motors (not shown) to move tape media 102 along a path of travel or movement that is generally indicated by arrows 112a-c. FIG. 1 shows further that the tape path of travel must change directions several times, as it is routed between reels 106 and 108 and passes tape head 104. Accordingly, tape guides 110 are located at different positions along the path of travel, and tape 102 is partially wrapped around each guide to accomplish respective direction changes. Each of the guides 110 is designed in accordance with an embodiment of the invention, to achieve purposes thereof.

Figure 2:
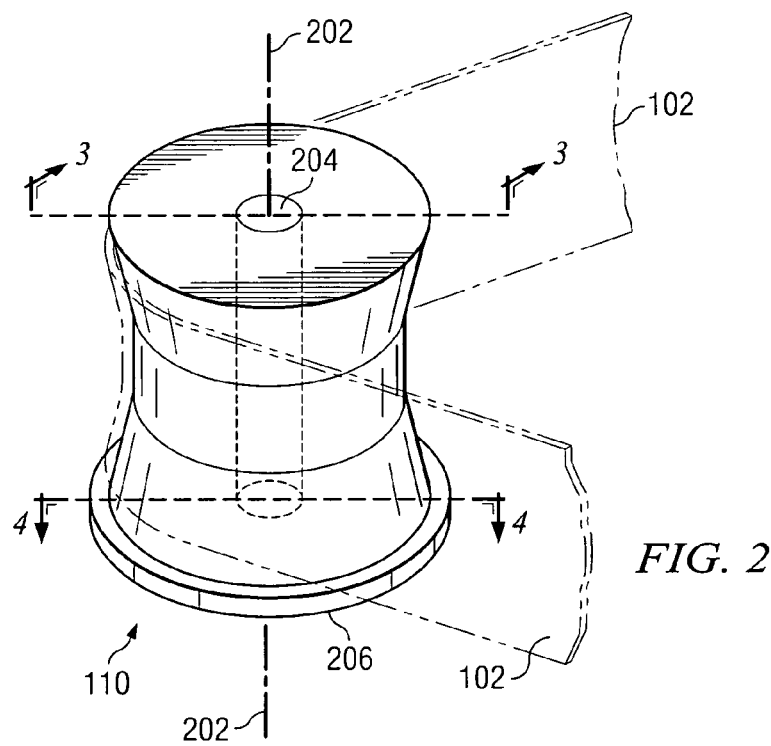
FIG. 2 is a perspective view showing the embodiment of FIG. 1 in greater detail.

FIG. 2 is a perspective view showing one of the tape guides 110 in greater detail. The guide 110 is aligned along a vertical axis 202, and is mounted by means of a pin or shaft 204, also aligned along vertical axis 202. In some applications pin 204 will be fixed in place, and guide 110 will be able to rotate around the pin, possibly using bearings. In other applications guide 110 will be fixably held in place by pin 204, as an immoveable post that would not be able to rotate.

FIG. 2 further shows tape guide 110 provided with a bottom flange 206. Flange 206 is of circular configuration, and extends around the lower edge of guide 110, as viewed in FIG. 2. While not shown, a similar flange may extend around the upper edge of guide 110.

Figure 3:
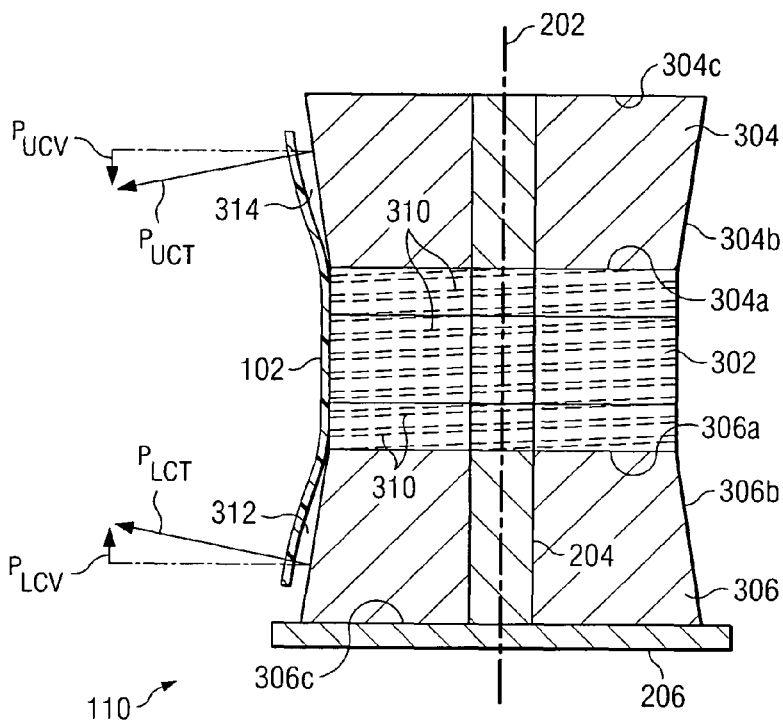
FIG. 3 is a sectional view taken along lines 3-3 of FIG. 2.

Referring to FIG. 3, there is shown tape guide 110 comprising a single structure having three distinct components 302, 304 and 306. More specifically, component 302 is a central component comprising a cylindrical section. Component 304 is an upper component comprising a frustoconical section that extends upward from central component 302, as viewed in FIG. 3. The smaller end 304a of upper component 304 is joined to cylindrical component 302, so that upper component 304 extends outwardly as it extends upward, to form a tapered surface 304b.

In similar manner, component 306 is a lower section comprising a frustoconical section that extends downward from central component 302, as viewed in FIG. 3. The smaller end 306a of lower component 306 is joined to cylindrical component 302, so that component 306 also extends outwardly as it extends downward, to form a tapered surface 306b. The axes of the three components 302, 304, and 306 are respectively aligned with one another, along axis 202.

The operating principle of the self-centering guide 110 of the invention may be understood by considering the effects of the three components 302-306 on a moving data storage tape 102. When a tape drive 100 is not operational, or when there is no tension applied by wheels of motors of the drive to the tape, the tape rests on its edge on the bottom flange 206 on the tape guide. As the tape 102 starts to move over the guide surface due to the application of the tension and the rotation of the wheels, and if the tape has a sufficient wrap around the guide 110, a film of air, also known as an air bearing, develops between the tape 102 and the surface of the guide. The air bearing pressure diminishes as one nears the edges of the tape.

FIG. 3 further shows the cylindrical central component 302 of guide 110 provided with circumferential grooves 310. More particularly, the grooves 310 are formed around the circumference of the outer surface of the cylindrical component 302. The grooves act to continually bleed air away from the space between cylindrical component 302 and the tape 102, to prevent any air bearing or film from developing therebetween. As a result, the outer surface of cylindrical component 302 generally remains in contact with tape 102 as the tape moves, and applies friction damping to the tape.

The grooves formed in component 302 also serve to decouple air bearings 312 and 314 from each other. Air bearing 312 is developed between tape 102 and tapered surface 306b of lower guide component 306, when tape 102 is moving. Air bearing 314 is similarly developed between tape 102 and tapered surface 304b of upper guide component 304. The selection of the respective dimensions of the tapered guide components 304 and 306 determines the position of tape 102 along the guide axis, as described hereinafter in further detail.

In the arrangement shown in FIG. 3, the pressure due to an air bearing at any point on a surface is generally directed perpendicular to the surface. Thus, the air bearing 312, over the tapered surface 306b of lower guide component 306, generates a pressure $P_{LCT}$ having a vertical component $P_{LCV}$ that biases the tape 102 upwardly along axis 202, toward the upper guide component 304. This upward directed force applied to tape 102 increases as a linear function with downward displacement of the tape 102. That is, the force $P_{LCV}$ increases as tape 102 moves downward, toward edge 306c of lower component 306.

In like manner, the air bearing 314, over the tapered surface 304b of upper guide component 304, generates a pressure $P_{UCT}$ that applies a downward-directed vertical force component $P_{UCV}$ to the tape 102. This force likewise is a function of the position of tape 102 along axis 202, and increases as a linear function with upward displacement of tape 102. That is, the force $P_{UCV}$ increases as tape 102 moves upward, toward edge 304c of upper component 304.

From the characteristics described above for the vertical forces generated by the air bearings, it is seen that as the tape moves higher along the guide, the tapered surface of upper guide component 304 applies a progressively greater downward force $P_{UCV}$ to the tape 102. In like manner, as the tape moves lower, a progressively greater upward force $P_{LCV}$ is applied to tape 102. Since both vertical forces increase as a linear function of the vertical displacement of tape 102, but in opposing directions, the two forces together will tend to urge tape 102 into an equilibrium or mean position, somewhere between the edge members 304c and 306c of guide 110, as the tape moves along its path of travel. This equilibrium position is determined by the resultant of the vertical forces $P_{UCV}$ and $P_{LCV}$. Each of these forces, in turn, is determined by the respective dimensions of its corresponding frustoconical section. In one useful embodiment, the two frustoconical sections are substantially identical in size and shape, so that all their corresponding dimensions are equal. In this embodiment, the forces $P_{UCV}$ and $P_{LCV}$ will collectively urge tape 102 to a position whereby its centerline will lie along the midpoint of guide 110, half-way between upper edge 304c and lower edge 306c. This will place the upper and lower edges of tape 102 at substantially equal distances from edge members 304c and 306c, respectively. This arrangement should ensure that neither tape edge comes in contact with either of the guide edge members, during normal operation as the tape moves along its path of travel. This arrangement also does not bias the tape against any one surface, and does not rely on physical contact between any portion of the tape and any guide structure.

Moreover, with the above guide configuration, only a relatively small width of the tape is brought to surface contact with the guide. Such small surface contact is far less detrimental to tape life than contact between the guide and the tape edge, as the tape is being moved along its path of travel.

Figure 4:
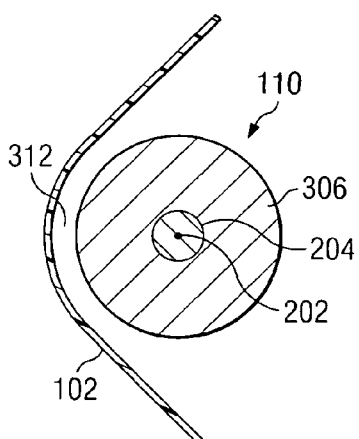
FIG. 4 is a sectional view taken along lines 4-4 of FIG. 2.

Referring to FIG. 4, there is shown tape 102 spaced apart from lower component 306 of guide 110 by the air bearing 312.

Figure 5:
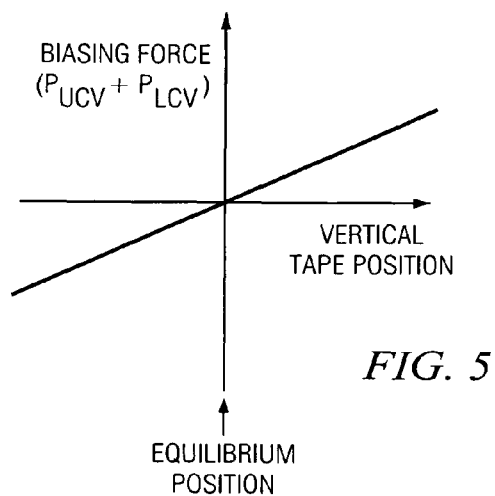
FIG. 5 is a curve showing a biasing force plotted against tape position for use in illustrating important principles of the embodiment of FIG. 1.

The dynamics of the downward and upward biasing forces $P_{UCV}$ and $P_{LCV}$, respectively generated by upper component 304 and lower component 306 of guide 110 and applied to the moving tape, are further illustrated by the curve of FIG. 5, and by FIGS. 6-8. FIG. 5 is a plot of the resultant biasing force, applied to move tape 102 vertically along guide 110, versus the tape vertical position. It will be readily apparent that the resulting biasing force is the sum of $P_{UCV}$ and $P_{LCV}$, with the former force being directed downward and the latter being directed upward.

FIG. 6 shows the tape below its equilibrium position. In this position, the dominant biasing force component is the linear component $P_{LCV}$, generated by the tapered surface 306b of lower guide component 306. This force will overcome the force $P_{UCV}$, and urge tape 102 upwardly along guide 110.

FIG. 7 shows the tape above its equilibrium position. In this position, the dominant biasing force component is the linear component $P_{UCV}$, generated by the tapered surface 304b of upper guide component 304. This force will overcome force $P_{LCV}$, and urge tape 102 downwardly along guide 110.

FIG. 8 shows the tape at its equilibrium position. In this position the opposing biasing forces $P_{UCV}$ and $P_{LCV}$ balance each other out. Accordingly, the tape tends to remain at its equilibrium position.

In other embodiments of the invention, the sizes or dimensions of the upper and lower frustoconical sections may be made to be different from one another.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tape guide configured to position a tape media, said tape guide comprising:
   a central component comprising a cylindrical section having an axis, one or more grooves formed in an outer surface of the cylindrical section of the central component and first and second ends in spaced apart relationship;
   first and second end components fixably joined in a contiguous relationship with said first and second ends, respectively, of said central component to collectively form an integral structure disposed to engage a side of said tape media as it moves along a path of travel;
   said first end component having a generally frustoconically shaped outer surface extending along said axis from said central component outward to a first flange portion and being configured to apply a first force to said tape media to urge said tape media along said axis away from the first flange portion of said first component toward the central component, said first force increasing as a linear function of the position of said tape media along said axis; and
   said second end component having a generally frustoconically shaped outer surface extending along said axis from said central component outward from the second end of the central component and being configured to apply a second force to said tape media to urge said tape media along said axis away from a second end of said second component toward the central component, said second force likewise increasing as a linear function of the position of said tape media along said axis, the collective effect of said first and second forces tending to urge said tape media to a preselected position between said first and second end components as said tape media moves along said path of travel,
   wherein said first force is generated by a first air bearing, formed between said frustoconically shaped outer surface of the first end component and said tape media, and said second force is generated by a second air bearing, formed between said frustoconically shaped outer surface of the second end component and said tape media,
   wherein the one or more grooves are formed in the outer surface of said central component, the one or more grooves extending from adjacent the first end of the central component to adjacent the second end of the central component, the one or more grooves operating to bleed air away from a joint between said central component and any portion of the tape media in engagement therewith, and to thereby decouple said first and second air bearings from one another,
   wherein said first and second air bearings collectively act to enable only a comparatively small portion of said tape media, measured along its width, to contact the surface of said integral structure as said tape media moves along its path of travel.

2. The tape guide of claim 1, wherein:
   the frustoconically shaped outer surface of each of said first end component and said second end component includes a tapered outer surface and a smaller diameter end, the smaller diameter end of said first end component being fixably joined in contiguous relationship with said first end of said central component, and the smaller diameter end of said second end component being fixably joined in contiguous relationship with said second end of said central component.

3. The tape guide of claim 1, wherein:
   said axis is vertically oriented, said first and second end components are located above and below said central component, respectively, and all of said components are aligned in coaxial relationship with one another.

4. The tape guide of claim 3, wherein:
   said first and second forces collectively urge said tape media to a position along said axis whereby upper and lower edges of said tape media are substantially equidistant from first and second edge members, respectively, of said first and second end components.

5. The tape guide of claim 2, wherein:
   said first and second end components respectively comprise frustoconical sections having corresponding dimensions that are substantially equal to one another.

6. The tape guide of claim 2, wherein: said first and second forces are substantially equal to one another when the centerline of said tape media is positioned along said axis midway between first and second edge members, respectively, of said first and second end components.

7. The tape guide of claim 1, wherein:
   said integral structure is mounted for rotation about a vertical axis.

8. The tape guide of claim 1, wherein:
   said integral structure is fixably mounted about a vertical axis.

9. The tape guide of claim 8, wherein:
   said tape media is disposed to wrap partially around said integral structure as said tape media moves along its path of travel.

10. A method for selectively positioning a tape with respect to a guide as said tape moves along a path of travel, said method comprising the steps of:
    providing a tape drive system having said tape in contact with said guide;
    generating a first force through selected interaction between said tape and a first component of said guide to urge said tape in a first direction along a guide axis;
    generating a second force through selected interaction between said tape and a second component of said guide, said second force urging said tape in a direction opposite to said first force, said first and second forces combining to provide a resultant force that urges said tape to an equilibrium position wherein contact between edges of said tape and structure of said guide is not permitted and wherein said tape interacts with said first and second components to form first and second air bearings, respectively, said first air bearing generating said first force and said second air bearing generating said second force;

providing said first component with a generally frustoconically shaped outer surface that is configured to provide a linear relationship between said first force and displacement of said tape;

providing said second component with a generally frustoconically shaped outer surface that is configured to provide a linear relationship between said second force and displacement of said tape;

providing a central component comprising a cylindrical section having an axis, one or more grooves formed in an outer surface of the cylindrical section of the central component, and first and second ends in a spaced apart relationship, wherein the central component is positioned between the first and second components so that the first and second end of the central component is fixably joined in a contiguous relationship with the first and second end components to form an integral structure; and the one or more grooves extending from adjacent the first end of the central component to adjacent the second end of the central component, the one or more grooves operating to bleed air away from a joint between said central component and any portion of the tape in engagement therewith, and to thereby decouple said first and second air bearings from one another, wherein the first and second air bearings collectively act to enable only a comparatively small portion of said tape, measured along its width, to contact the surface of said integral structure as said tape moves along its path of travel.

11. The method of claim 10, wherein:
said first and second components are spaced apart from one another along said guide axis.

12. The method of claim 11, wherein:
said first force increases as a linear function of displacement of said tape toward said first component, and said second force, directed in opposition to said first force, increases as a linear function of displacement of said tape toward said second component.

13. The method of claim 10, wherein:
said first and second components respectively comprise frustoconical sections, wherein corresponding dimensions of said frustoconical sections are substantially equal to each other.

14. The method of claim 13, wherein:
a the central component of said guide is positioned between said first and second components, and said axis is vertically oriented, said first and second components being located above and below said central component, respectively.

* * * * *

UNITED STATES PATENT AND TRADEMARK OFFICE
CERTIFICATE OF CORRECTION

| | | |
|---|---|---|
| PATENT NO. | : 7,800,863 B1 | Page 1 of 1 |
| APPLICATION NO. | : 11/097413 | |
| DATED | : September 21, 2010 | |
| INVENTOR(S) | : Venkataraman Kartik | |

It is certified that error appears in the above-identified patent and that said Letters Patent is hereby corrected as shown below:

Column 8, Line 24, Claim 14:

Delete "a the central" and insert -- the central --.

Signed and Sealed this

Seventh Day of December, 2010

David J. Kappos
*Director of the United States Patent and Trademark Office*